UNITED STATES PATENT OFFICE.

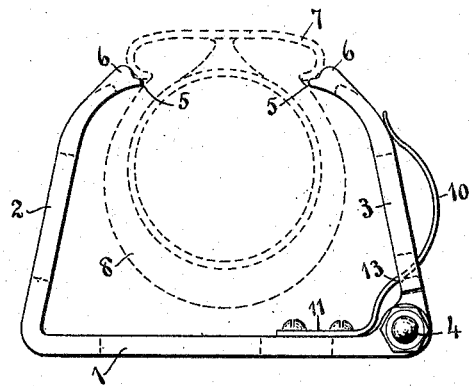
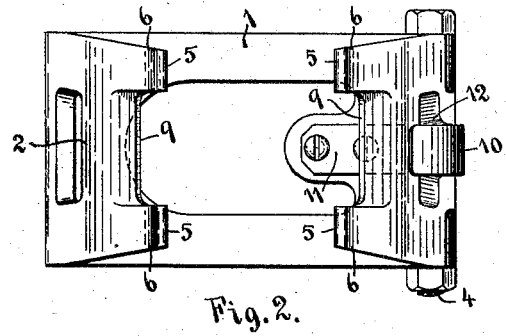
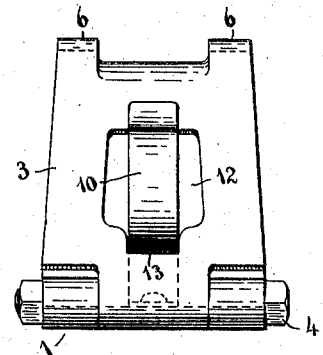

BAILEY S. WESCOTT, OF ELMIRA, NEW YORK.

STORAGE TIRE-PROTECTOR.

981,047. Specification of Letters Patent. Patented Jan. 10, 1911.

Application filed February 8, 1910. Serial No. 542,737.

*To all whom it may concern:*

Be it known that I, BAILEY S. WESCOTT, a citizen of the United States, residing at Elmira, in the county of Chemung and State of New York, have invented a new and useful Storage Tire-Protector, of which the following is a specification.

This invention relates to improvements in devices for supporting the wheels of automobiles, motor-cycles, and the like, when standing in storage, or in the garage, to relieve the tires from the weight of the vehicle; and my object is to provide a simple and effective device of this character which can be readily applied and quickly removed from the wheels.

I attain my object by constructing the protectors in the manner illustrated in the accompanying drawings, in which—

Figure 1 represents a front elevation of one of my protectors, with a wheel rim and tire shown as positioned therein in broken lines; Fig. 2, a plan view of the protector; and Fig. 3 a side elevation looking from right to left in Fig. 1.

Like numerals designate like parts in the several views.

In carrying out my invention I provide a protector for each wheel of the vehicle, and so construct the protectors that the rims of the wheels will rest thereon, when raised sufficiently to place the tire above contact with the ground. As shown in the drawings, each one of a set of protectors consists of a stand having a base-plate 1, provided at one side with an integral upwardly projecting arm 2, and at the opposite side with a similar arm 3, hinged to the base by a hinge bolt 4. The arms 2 and 3 are slightly inclined toward one another, and are curved over at their upper ends to terminate in inward projections 5, adapted to receive thereon a wheel rim 7, in such manner that the tire 8 will be raised out of contact with the ground. In order to prevent the projections 5 from being pressed inward toward one another, so as to pinch the tire, I provide shoulders at 6 which will rest against the sides of the wheel rim, as shown in Fig. 1. There are two of these projections 5 on each arm, separated by a space 9, to provide two points of contact between the arms and the wheel rim at each side of the wheel, in order that the weight may be better distributed between the wheel rim and the stand, and also to prevent the wheels from rolling off from the stands.

To support the hinged arm 3 in normal position I provide a spring 10, which is fastened to the base at 11, and passes upward and outward through an opening 12 provided therefor. The spring is so bent at 13 that it will contact with the bottom of the opening 12 to prevent the arm 3 from being thrown downward upon the base when the protector is removed from a wheel. This stop will be so arranged as to give the necessary freedom of motion to the arm 3 to bring it into contact with the narrowest wheel rim.

To apply the protectors, as so constructed, to the wheels, the wheels will be jacked up or otherwise raised in turn and a protector applied thereto by pulling the arm 3 outwardly sufficient to permit the projections 5 on the two arms to pass over the tire; the arm 3 being then released to bring the arms 2 and 3 into contact with the wheel rim, as shown in Fig. 1; after which the protector will be swung down into position in vertical alinement with the hub of the whel, the wheel being then lowered until the weight rests upon the protector. The protectors for the forward wheels may be placed in position upon the ground, and the vehicle run up by its own power to place the forward wheels thereon; after which the rear wheels will be jacked up and the protectors placed thereunder, as described. Preferably, however, each wheel will be jacked up in turn and the protectors applied thereto.

Without confining myself to the precise construction of the protectors as herein illustrated, what I claim as my invention and desire to secure by Letters Patent is—

A tire protector comprising a stand having a flat base and two upwardly extending and inwardly inclined arms, one of said arms being hinged to the base, said arms having their free ends each provided with two points of support adapted to receive thereon the rim of a wheel at opposite sides of the tire in such a manner that the pressure of the rim upon said points of support will have the effect of pressing the arms toward one another, and means on the arms adapted to engage the sides of the rim to limit their inward movement.

In testimony whereof I have affixed my signature, in presence of two witnesses.

BAILEY S. WESCOTT.

Witnesses:
M. E. VERBECK,
EUGENE DIVEN.